United States Patent
Davis et al.

(10) Patent No.: US 9,412,158 B2
(45) Date of Patent: Aug. 9, 2016

(54) METHOD OF CONFIGURING A MACHINE VISION APPLICATION PROGRAM FOR EXECUTION ON A MULTI-PROCESSOR COMPUTER

(75) Inventors: Jason Adam Davis, Franklin, MA (US); Adam Wagman, Wilmington, MA (US)

(73) Assignee: COGNEX CORPORATION, Natick, MA (US)

( * ) Notice: Subject to any disclaimer, the term of this patent is extended or adjusted under 35 U.S.C. 154(b) by 1411 days.

(21) Appl. No.: 12/194,055

(22) Filed: Aug. 19, 2008

(65) Prior Publication Data

US 2010/0049341 A1 Feb. 25, 2010

(51) Int. Cl.
*G06T 7/00* (2006.01)
*G06F 9/44* (2006.01)
*G06T 1/20* (2006.01)
*G06F 9/50* (2006.01)
*G05B 19/42* (2006.01)
*G05B 19/042* (2006.01)

(52) U.S. Cl.
CPC .......... *G06T 7/0004* (2013.01); *G05B 19/0421* (2013.01); *G06F 8/314* (2013.01); *G06F 9/5066* (2013.01); *G06T 1/20* (2013.01); G05B 2219/37208 (2013.01); G06F 2209/504 (2013.01); G06F 2209/5017 (2013.01)

(58) Field of Classification Search
USPC ......... 382/100, 141–153, 173, 232, 254, 276; 348/86–95; 712/1, 10–22, 28–32, 712/34–35
See application file for complete search history.

(56) References Cited

U.S. PATENT DOCUMENTS

| 7,383,536 B1* | 6/2008 | Petry et al. ..................... 717/125 |
| 2005/0198102 A1* | 9/2005 | Hahn et al. ..................... 709/200 |
| 2007/0300231 A1* | 12/2007 | Aguilar et al. ................ 718/104 |
| 2008/0013862 A1* | 1/2008 | Isaka et al. ..................... 382/303 |
| 2008/0244588 A1* | 10/2008 | Leiserson et al. ............. 718/102 |
| 2008/0260296 A1* | 10/2008 | Chung et al. .................. 382/307 |
| 2009/0307704 A1* | 12/2009 | Munshi et al. ................ 718/104 |

OTHER PUBLICATIONS

Lebak, James, et al. "Parallel VSIPL++: An open standard software library for high-performance parallel signal processing." Proceedings of the IEEE 93.2 (2005): 313-330.*
P.P. Jonker, J.G.E. Olk, C. Nicolescu, Distributed bucket processing: A paradigm embedded in a framework for the parallel processing of pixel sets, Parallel Computing, vol. 34, Issue 12, Dec. 2008, pp. 735-746, ISSN 0167-8191.*
Bergmann, Jules, and Don McCoy. "Sourcery VSIPL++ HPEC benchmark performance." HPCMP Users Group Conference, 2006. IEEE, 2006.*

(Continued)

*Primary Examiner* — Edward Park
*Assistant Examiner* — Nathan Bloom
(74) *Attorney, Agent, or Firm* — Quarles & Brady LLP

(57) ABSTRACT

A machine vision system includes a computer with one or more processors and software that has a plurality of tool routines each performing a different image analysis function. A machine vision application program is created by selecting certain ones of the plurality of tool routines to analyze the image. A maximum number of processors on the computer is designated as available for executing a machine vision application, wherein the maximum number may be less than the total number of processors on the computer. When the machine vision application program operates execution of each tool routine is limited to using simultaneously no more than the maximum number of processors.

21 Claims, 1 Drawing Sheet

(56) References Cited

OTHER PUBLICATIONS

Campbell, Daniel P. High Performance Embedded Computing Software Initiative (HPEC-SI) Program Facilitation of VSIPL++ Standardization. Georgia Tech Applied Research Corp Atlanta GA, 2008.*

H. Hoffmann, J. Kepner, and R. Bond, S3P: Automatic, Optimized Mapping of Signal Processing Applications to Parallel Architectures, HPEC 2001.*

Chen, Yingming, Chenyang Lu, and Xenofon Koutsoukos. "Optimal discrete rate adaptation for distributed real-time systems." Real-Time Systems Symposium, 2007. RTSS 2007. 28th IEEE International. IEEE, 2007.*

Frank J. Seinstra, Jan-Mark Geusebroek, Dennis Koelma, Cees G.M. Snoek, Marcel Worring, Arnold W.M. Smeulders, "High-Performance Distributed Video Content Analysis with Parallel-Horus", IEEE MultiMedia, vol. 14, No. 4, pp. 64-75, Oct.-Dec. 2007.*

Van Der Meer, P. J., J. Van Der Zwaan, and F. J. Seinstra. "Parallel-Horus: On the Efficiency of Lazy Parallelization and the Introduction of Task Parallel Support." Internal Report, Intelligent Sensory Information Systems,Faculty of Science, University of Amsterdam, The Netherlands, Jun. 2004. http://www.cs.vu.nl/~fjseins/pub_tech.shtml.*

VisionPro Software Brochure, Cognex Corporation, 2008, selected Internet pages http://www.cognex.com/ProductsServices/VisionSoftware/.

Halcon Software Brochure, MVTEC Software GmbH, 2008, selected Internet pages http://www.mvtec.com/halcon/.

Binstock, Andrew, "Multi-Core Processor Architecture Explained" Intel Corporation, Published: Tuesday, Sep. 5, 2006; Last Modified: Thursday, May 22, 2008.

* cited by examiner

METHOD OF CONFIGURING A MACHINE VISION APPLICATION PROGRAM FOR EXECUTION ON A MULTI-PROCESSOR COMPUTER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a machine vision system, such as those used to inspect objects moving along a manufacturing assembly line; and more particularly to configuring software for the machine vision system to execute on a particular computer.

2. Description of the Related Art

Machine vision systems include a camera for producing a video image of an object to be analyzed and a computer that receives the video image and executes software that analyzes the image. The computer may also be programmed to operate other equipment in response to the results of the analysis. For example, if the image analysis determines that a product on a manufacturing assembly line has a defect, the computer may operate an actuator that diverts the defective product off the assembly line.

The user of a machine vision system is able to purchase the camera and a circuit board that inserts into a conventional personal computer to interface the camera to that computer. The circuit board stores a snapshot video image for analysis by software that is executed on the personal computer. Such software available from a number of companies, such as the VisionPro® software marketed by Cognex Corporation of Natick, Massachusetts, USA. The image processing software includes a basic program and a library of a large number routines, known as tools or tool routines, which enable the basic program to perform specific operations. For example, different tool routines are provided to perform pattern matching, barcode reading, color identification, finding edges of objects, and locating lines and geometrical shapes, as well as other functions.

The user configures the software to analyze images of a particular object, such as a product traveling along an assembly line for example. In doing so, the user selects the specific tool routines needed to perform the desired image analysis to adapt the basic program for that application. For example, the software may be configured to determine whether a pattern in an acquired image of the object matches a reference pattern stored in the computer memory. Such pattern matching can be employed to determine whether a product has been properly manufactured with various elements, such as holes and components, present and properly located.

Historically the machine vision software ran on a computer that had a single processor. In recent years, inexpensive multiple processor computers have become available. For example, personal computers are now available with multiple "core" processors from Intel Corporation of Santa Clara, Calif., USA, which have two or four separate cores in the single integrated circuit. Often these devices are referred to as a dual or quad core processor in that the cores are formed on a single integrated circuit, but in essence, the cores are separate processors which execute different sets of instructions simultaneously and independently. Another version of a multiple processor computer can be produced with totally separate integrated circuits forming each individual processor. In addition computers have a general purpose processor and a special purpose processor, such as a math or geometry coprocessor, for executing specific types of instructions. Thus the term "multiple processors" refers to any computer that has components that enable different sets of program instructions to be executed simultaneously or in parallel. Such different sets of program instructions may be from different software program or from the same software program. Execution of different sets of program instructions simultaneously in parallel on multiple processors is distinguished from "concurrent execution" of different sets of program instructions which occurs in a time division multiplexed manner on one processor.

The increase in availability of multiple processor computers has lead the developers of machine vision software to adapt that software for execution on those computers. The suite of software tool routines is often provided with two versions of each tool routine, one for a single processor system and another version that can be executed on multiple core processors. This required the end user, when selecting a particular tool routine during the program configuration for a specific application, to choose either the single processor or a multiple core version of that tool routine for incorporation into the application program. Because machine vision application programs frequently contained a relatively large number of tool routines, this tool by tool designation of the number of processors was time consuming. During subsequent execution machine vision application program, the multiple core version of each tool routine automatically used all the processor cores on the processor and could not be configured to use less that all the processor cores.

Nevertheless, there were times when one of the processor cores has to be dedicated to executing another application program and thus less that all the cores of the processor integrated circuit were available for execution of a machine vision program tool routine. If in that situation the machine vision program was configured to use all the processors on the computer, execution of that program had to contend with other programs demanding to use some of the same processors. Therefore previous machine vision software for multiple processor computers was not optimized for a variety of possible computer operating conditions and situations.

SUMMARY OF THE INVENTION

A method to analyze an image id performed by a machine vision system that has a computer with one or more processors. That method provides software that includes a plurality of tool routines which are individually selectable by a user and which perform a variety of image analysis functions. At least some of the tool routines are able to be executed simultaneously on multiple processors. A machine vision application program to analyze a particular image of interest is created by selecting certain ones of the plurality of tool routines to perform that analysis. As part of creating the machine vision application program a maximum number of processors on the computer are designated as available for executing a machine vision application program. That maximum number may be less than the total number of processors on the computer. For example it may be desirable to reserve one or more of the processors for the simultaneous execution of another program. When the machine vision application program operates, each of the selected tool routine is configured use no more than the maximum number of processors.

An aspect of the present method is that each tool routine used by the machine vision application program configured to use a number of processors that is equal to a lesser of the maximum number of processors and the greatest number of processors that the respective tool routine is capable of using simultaneously.

Another aspect of the present method is that two separate tool routines are able to be executed simultaneously on different processors.

Another aspect of the present method is that designation of the maximum number of processors can be changed dynamically by the machine vision application program, during execution, changing the maximum number designation.

DETAILED DESCRIPTION OF THE INVENTION

Figure 1:
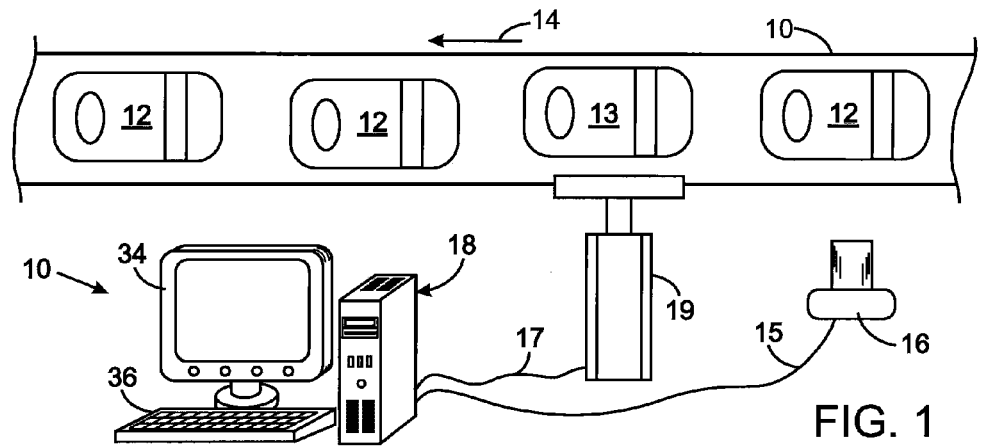
FIG. 1 is a schematic depiction of a machine vision system adjacent an assembly line.

With initial reference to FIG. 1, a machine vision system 10 is located adjacent an assembly line 11 that transports objects 12 and 13 along a direction indicated by arrow 14. The machine vision system 10 comprises a camera 16 that produces a video image as each object passes nearby. The video images are transferred via a cable 15 to a computer 18, such as a personal computer. The computer can operate equipment on the assembly line in response to analysis of the video images. For example, the computer 18 operates a diverter 19 which, if operated at the instant depicted in FIG. 1, would push object 13 off the assembly line 11 onto a bin or other receptacle on the opposite side from the diverter. In that manner, items that are detected by the machine vision system 10 as having a defect can be removed from the assembly line.

Figure 2:
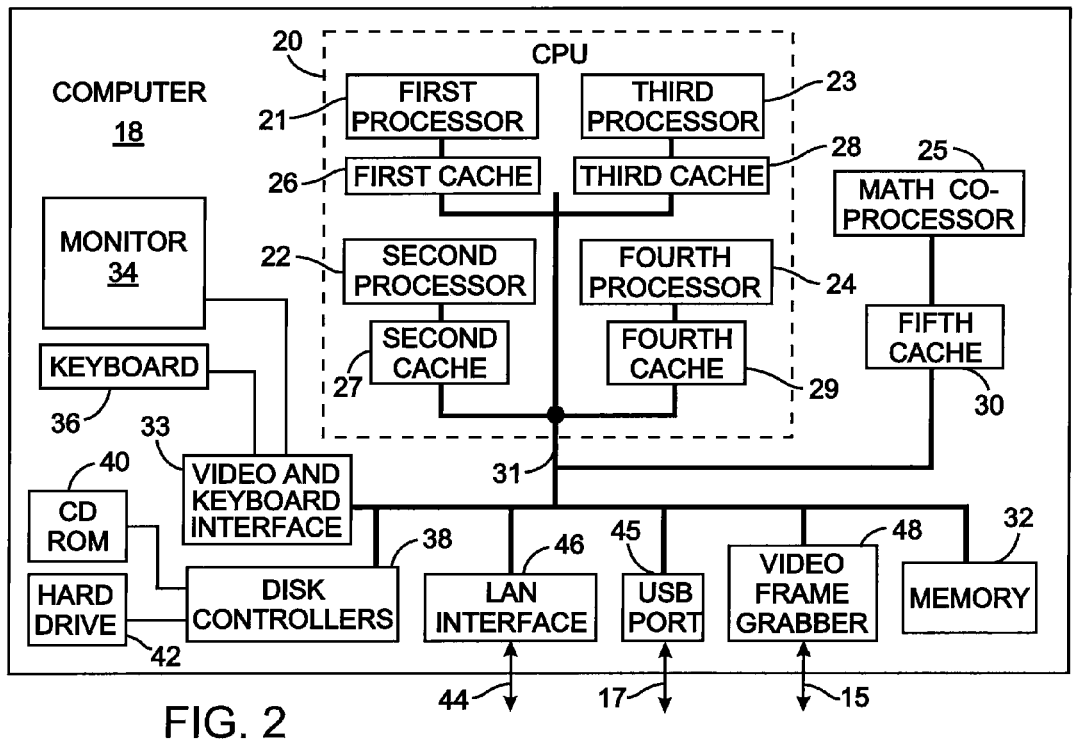
FIG. 2 is a block diagram of the personal computer in the machine vision system of FIG. 1.

As shown in FIG. 2, the computer 18 has a central processing unit (CPU) 20 that comprises four processors 21, 22, 23, and 24, which can simultaneously execute separates set of software instructions, in a manner known as parallel execution. Those different sets of program instructions can be from different software programs or from the same software program. Each processor 21, 22, 23, and 24 is interfaced via separate cache memory 26, 27, 28, and 29, respectively, to a primary bus system 31. For example, the CPU 20 may be a Core™ 2 Quad processor available from Intel Corporation. The computer 18 also includes a math co-processor 25, that is a conventional device adapted to execute mathematical software instructions and is interfaced via a fifth cache memory 30 to the primary bus system 31. The primary bus system 31 also is connected to the memory 32 and to a video and keyboard interface 33 to which a monitor 34 and a computer keyboard 36 are coupled. Disk controllers 38 interface a CD-ROM 40 and a conventional hard drive 42 to the primary bus system 31.

The computer 18 is connected to an external local area network 44 by means of a LAN interface 46. If the camera 16 produces an analog image signal, the cable 15 from the camera is connected to a commercially available interface circuit, commonly referred to as a "video frame grabber" which acquires and temporarily stores the video images from for analysis. If a digital camera is used, that video frame grabber is replaced by a standard USB port or other type of digital port that interfaces the camera 16 to the computer with the acquired digital images being stored in the memory 32. The cable to the diverter 19 in FIG. 1 is connected to a USB port 45.

Image processing software is loaded into the computer memory 32 and includes a basic program and a library of a plurality of tool routines, which enable the basic program to perform specific operations. Tool routines are provided for pattern matching, barcode reading, color identification, finding edges of objects, and locating lines and geometrical shapes, as well as other well known image processing functions. Many of the tool routine are written to be executable both on one processor and on multiple processors simultaneously, with the number of the processors being assigned when each tool routine executes depending upon how many processors are available for use at that time, as will be described. Some of the tool routines perform relatively simple functions and do not require the capability to be executed simultaneously on multiple processors.

After the image processing software has been loaded into the computer 18, the user commences execution of that software and initiates its configuration mode by entering appropriate commands into the keyboard 36. The configuration mode enables the user to create a machine vision application program to perform defined analysis operations on images acquired from the camera 16. One step in the configuration mode requires the user to designate whether the computer 18 has a single processor or multiple processors. If the computer has multiple processors, the user is further asked to specify globally the maximum number of processors that will be available for use by the machine vision application program. This number may be equal to or less than the total number of processors in the computer 18, i.e. the four general purpose processors 21-24. In other words, the machine vision application program does not have to be configured to use all the processors in the computer. It may be desirable to specify less than the total number of processors on the computer, so that at least one processor will be reserved to be available for executing another application program that may be required to run simultaneously with the machine vision application program. For example, the computer 18 may also control another function of the assembly line 11 and it may not be desirable to delay that function while the machine vision application program is analyzing an image. As a consequence, the user may specify that a maximum of three processors can be used simultaneously to execute the machine vision application program, even though the computer 18 has a total of four processors 21-24. It should also be recognized that some tool routines require less than the designated maximum number of processors available to the machine vision function, in which case the execution of that tool routine will only use the number of processors required. This global definition of the maximum number of processors to use affects execution of all the machine vision tool routines and other parts of the machine vision application program. The user does not have to specify individually the number of processors to be utilized by each tool routine. The designation of the maximum number of processors available for use by the machine vision application program is stored in table of configuration data within memory 32. Such configuration data tables are well known for use with programs in general and machine vision application programs in particular.

The user then continues to create the machine vision application program by sequentially selecting the specific tool routines from the routine library that are required to perform the desired analysis of an image of interest. For each selected tool routine, the user also defines execution parameters in the same manner as was done for previous machine vision programs. The tool selection process continues until all the tool routines needed for the specific machine vision application program have been chosen and configured. Completion the machine vision application program setup is designated by the user via the keyboard and monitor 34, at with time that program is stored in the computer memory 32.

The machine vision system 10 then is placed in an operating mode in which the computer 18 executes the machine vision application program and images are acquired periodically from camera 16 for analysis. Upon being called for execution by the machine vision application program, each tool routine accesses the configuration table to obtain the global designation of the maximum number of processors that are available. Based on that designation, the tool routine automatically configures itself for execution on a certain number of processors. That number of processors is the lesser of the maximum number of processors globally designated for use by the machine vision application program and the greatest number of processors that the particular tool routine is capable of using. For example, even though there may be four processors designated as available to the machine vision operation, the tasks performed by a specific tool routine may only need one or two of processors and thus that tool routine becomes configured for only one or two processors. Another tool routine that performs a relatively simple function, e.g., merely detecting the presence of any object in the image, may require only a single processor for speedy execution.

The machine vision application program contains standard instructions for interfacing with the multiple processors in a conventional manner, such as is well known for a computer that has a Core™ 2 Quad processor integrated circuit from Intel Corporation and a corresponding operating system. The execution of the machine vision application program and particularly the embedded tool routines employs what is commonly referred to as multithreading. Programs are made up of execution threads which are sequences of related instructions that can be run simultaneously on different processors. In the simplest case each thread could be from a separate program, whereas in the context of the present invention the threads are all from the machine vision application program but relate to different operations. In one case, the instructions of different tool routines may run on different processors so that the same image is analyzed for separate features at the same time. For example, an optical character reader tool routine can be reading the characters on an object in the image, while another tool routine, executing on a different processor, is looking for a defined geometric pattern in the image. Thus threads from different tool routines are executed simultaneously. In another case, the same tool routine may be executed on multiple processors at the same time to increase the speed at which an image is analyzed, thereby partitioning the workload of the tool routine among separate processors. For example, if there are four processors available, the image can be divided into distinct quadrants with each quadrant being analyzed simultaneously by the same tool routine on a different processor. Thus the image is evaluated by that tool routine up to four times as fast as compared to a single processor computer.

Instructions in the machine vision application program also can change the designation in the configuration table of the maximum number of processors available for use. This enables various sections of the machine vision application program to be able to use different numbers of processors. For example one section that performs rudimentary functions that require only a few processors may execute when the configuration table designates a small maximum number of processors, thereby freeing the remaining processor for other functions or application programs. Another section of the machine vision application program that performs more intensive image processing may commence with an instruction that changes the global designation of the maximum number of processors available to a larger number, so that all the processors on the computer can be employed to analyze different portions of an image simultaneously.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for analyzing an image by a machine vision system that has a computer with one or more processors, said method comprising:
   providing image analysis software that includes a plurality of machine vision tool routines that are individually selectable by a user and that perform different machine vision image analysis functions, wherein each tool routine is capable of being executed both on one processor and simultaneously on a plurality of processors to analyze an image;
   creating a machine vision application program by selecting particular tool routines of the plurality of tool routines;
   designating, via the image analysis software, a program maximum number of processors on the computer that are available for executing the machine vision application program thereby producing a program maximum number designation, wherein the program maximum number may be less than a total number of processors on the computer;
   designating, for each of the particular tool routines of the plurality of tool routines, a respective tool-routine maximum number of processors representing a respective subset of the program maximum number of processors; and
   executing the machine vision application program wherein each of the particular tool routines is configured to use simultaneously one or more processors, up to the respective tool-routine maximum number of processors;
   wherein executing the machine vision application program comprises at least one tool routine of the plurality of tool routines analyzing different sections of the image simultaneously on different processors.

2. The method as recited in claim 1 wherein executing the machine vision application program comprises simultaneously executing different ones of the plurality of tool routines on different processors.

3. The method as recited in claim 1 wherein executing the machine vision application program simultaneously uses a number of processors that is equal to a lesser of the program maximum number of processors and a greatest number of processors that the machine vision application program is capable of using simultaneously.

4. The method as recited in claim 1 wherein executing the machine vision application program comprises configuring at least one of the plurality of tool routines for simultaneous execution on more than one processor.

5. The method as recited in claim 1 wherein executing the machine vision application program comprises configuring at least one of the particular tool routines of the plurality of tool routines for simultaneous execution on a number of processors that is equal to a lesser of the respective tool-routine maximum number of processors and a respective greatest number of processors that the at least one of the particular tool routines of the plurality of tool routines is capable of using simultaneously.

6. The method as recited in claim 1 wherein while executing the machine vision application program, each tool routine of the machine vision application program is configured to use simultaneously as many processors as that respective tool routine requires, up to the respective tool-routine maximum number of processors.

7. The method as recited in claim 1 wherein executing the machine vision application program comprises simultaneously executing two separate tool routines on different processors.

8. The method as recited in claim 1 wherein, while executing, the machine vision application program changes the program maximum number designation.

9. A method for analyzing an image by a machine vision system that has a computer with one or more processors, said method comprising:
    providing image analysis software that includes a plurality of machine vision tool routines that are individually selectable by a user and that perform a variety of image analysis functions;
    creating a machine vision application program by selecting certain ones of the plurality of tool routines;
    receiving from a person, using the machine vision application program to analyze an image, a designation of a program maximum number of processors on the computer that are available for executing a machine vision application program, wherein the program maximum number is less than a total number of processors on the computer;
    designating, for each of the certain ones of the plurality of tool routines, a respective tool-routine maximum number of processors that is smaller than the program maximum number of processors; and
    executing the machine vision application program wherein such executing may not simultaneously use more than the program maximum number of processors, and wherein each of certain ones of the plurality of tool routines is configured to use one or more processors, up to the respective tool-routine maximum number of processors;
    wherein executing the machine vision application program comprises simultaneously executing at least two of the certain ones of the plurality of tool routines on different processors.

10. The method as recited in claim 9 wherein each one of a group of the plurality of tool routines is capable of being executed both on one processor and simultaneously on a plurality of processors.

11. The method as recited in claim 9 wherein executing the machine vision application program simultaneously uses a number of processors that is equal to a lesser of the program maximum number of processors and a greatest number of processors that the machine vision application program is capable of using simultaneously.

12. The method as recited in claim 9 wherein executing the machine vision application program comprises configuring at least one of the certain ones of the tool routines of the plurality of tool routines for simultaneous execution on more than one processor.

13. The method as recited in claim 9 wherein executing the machine vision application program comprises configuring at least one of the certain ones of the plurality of tool routines for simultaneous execution on a number of processors that is equal to a lesser of the respective at least one tool-routine maximum number of processors and a respective greatest number of processors that the at least one of the certain ones of the plurality of tool routines is capable of using simultaneously.

14. The method as recited in claim 9 wherein executing the machine vision application program comprises changing the program maximum number designation.

15. A method for analyzing an image by a machine vision system that has a computer with one or more processors, said method comprising:
    providing software that includes a plurality of tool routines that are individually selectable by a user, and that perform different image analysis functions, wherein each tool routine is capable of being executed on one processor or a plurality of processors and at least one tool routine is capable of being executed both on one processor and simultaneously on a plurality of processors;
    creating a machine vision application program by selecting certain ones of the plurality of tool routines;
    receiving from a person using the machine vision application program to analyze an image input specifying a program maximum number of processors on the computer that are available for executing the machine vision application program thereby producing a maximum number designation, wherein the program maximum number is less than a total number of processors on the computer;
    designating, for one or more of the certain ones of the plurality of tool routines, a respective tool-routine maximum number of processors representing a respective subset of the program maximum number of processors; and
    executing the machine vision application program wherein each of the one or more tool routine is configured to use simultaneously one or more processors, up to the respective tool-routine maximum number of processors;
    wherein executing the machine vision application program comprises simultaneously executing at least two separate tool routines on different processors.

16. The method as recited in claim 15 wherein executing the machine vision application program comprises changing the program maximum number designation.

17. The method as recited in claim 1 wherein designating, via the image analysis software, the program maximum number of processors comprises employing software that enables a person using the machine vision system to specify the program maximum number of processors.

18. A machine vision system including a computer that comprises:
    a plurality of processors;
    a storage device containing:
        (a) image analysis software that includes a plurality of tool routines which are individually selectable by a user and which perform different image analysis functions, wherein at least one tool routine is capable of using more than one processor simultaneously to analyze an image, and
        (b) a machine vision application program defined by a selection of certain ones of the plurality of tool routines, including the at least one tool routine; and
    an input device operable, by a person using the machine vision application program, to designate a program maximum number of plurality of processors that are available for executing a machine vision application program, thereby producing a program maximum number designation, wherein the program maximum number is less than a total number of processors on the computer;

wherein the plurality of processors are configured to designate, for each of the certain ones of the plurality of tool routines, a respective tool-routine maximum number of processors that is smaller than the program maximum number of processors;

wherein executing the machine vision application program comprises simultaneously executing at least two of the certain ones of the plurality of tool routines on different processors;

wherein, when the computer executes the machine vision application program, each of the plurality of tool routines is configured to use simultaneously one or more processors, up to the respective tool-routine maximum number of processors; and wherein, during execution by the computer, the machine vision application program changes the program maximum number designation.

19. The method as recited in claim 18 wherein the computer is configured to execute the machine vision application program so that each one of a group of the certain ones of the plurality of tool routines is executed simultaneously on a different processor.

20. The method as recited in claim 18 wherein the computer is configured to execute the machine vision application program by simultaneously using a number of processors that is equal to a lesser of the program maximum number of processors and a greatest number of processors that the machine vision application program is capable of using simultaneously.

21. The method as recited in claim 18 wherein during execution by the computer, the machine vision application program changes the program maximum number designation such that different sections of the machine vision application program use different numbers of processors.

\* \* \* \* \*